(12) United States Patent
Mu

(10) Patent No.: US 12,418,933 B2
(45) Date of Patent: Sep. 16, 2025

(54) METHOD FOR TRANSMITTING FEEDBACK INFORMATION, USER EQUIPMENT

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 812 days.

(21) Appl. No.: 17/627,592

(22) PCT Filed: Jul. 16, 2019

(86) PCT No.: PCT/CN2019/096201
§ 371 (c)(1),
(2) Date: Jan. 14, 2022

(87) PCT Pub. No.: WO2021/007783
PCT Pub. Date: Jan. 21, 2021

(65) Prior Publication Data
US 2022/0272712 A1    Aug. 25, 2022

(51) Int. Cl.
*H04W 72/56* (2023.01)
*H04W 72/0446* (2023.01)
*H04W 72/1268* (2023.01)
*H04W 72/23* (2023.01)
*H04W 72/232* (2023.01)

(52) U.S. Cl.
CPC ....... *H04W 72/56* (2023.01); *H04W 72/0446* (2013.01); *H04W 72/1268* (2013.01); *H04W 72/23* (2023.01); *H04W 72/232* (2023.01)

(58) Field of Classification Search
None
See application file for complete search history.

(56) References Cited

U.S. PATENT DOCUMENTS

| | | |
|---|---|---|
| 2018/0027576 A1 | 1/2018 | Kowalski et al. |
| 2019/0081722 A1* | 3/2019 | Takeda ............... H04L 5/0048 |
| 2020/0358587 A1* | 11/2020 | Wang ..................... H04W 72/23 |
| 2021/0409182 A1* | 12/2021 | Lee ....................... H04L 5/0055 |
| 2022/0174705 A1* | 6/2022 | Shibaike ............... H04L 1/1854 |
| 2022/0217760 A1* | 7/2022 | Iyer ......................... H04L 5/003 |

(Continued)

OTHER PUBLICATIONS

European Patent Application No. 19937958.7, Search and Opinion dated Mar. 23, 2023, 9 pages.

(Continued)

*Primary Examiner* — Jutai Kao
(74) *Attorney, Agent, or Firm* — Cozen O'Connor

(57) ABSTRACT

The present disclosure relates to a method for transmitting feedback information, a user equipment and a base station, where the method includes: after a preset duration during which a transmission conflict occurs between feedback information for data of first service and data of second service, receiving first downlink control information (DCI) sent by a base station, in which a priority level of the first service is lower than a priority level of the second service; obtaining a transmission resource for retransmitting the feedback information for the data of first service from the first DCI; and retransmitting the feedback information for the data of first service through the transmission resource.

20 Claims, 5 Drawing Sheets after a preset duration during which a transmission conflict occurs between feedback information for data of first service and data of second service, receiving first DCI sent by a base station — S101 obtaining a transmission resource for retransmitting the feedback information for the data of first service from the first DCI — S102 retransmitting the feedback information for the data of first service through the transmission resource — S103

(56) References Cited

U.S. PATENT DOCUMENTS

2024/0023118 A1* 1/2024 Park .................. H04L 1/1861

OTHER PUBLICATIONS

Huawei et al. "UCI enhancements for URLLC" 3GPP TSG RAN WG1 Meeting #97, R1-1906058, May 2019, 10 pages.
Chinese Patent Application No. 201980001409.6, Office Action dated Jul. 21, 2023, 6 pages.
Chinese Patent Application No. 201980001409.6, English translation of Office Action dated Jul. 21, 2023, 8 pages.
Interdigital Inc. "HARQ Enhancements for NR-U" 3GPP TSG RAN WG1 Meeting #95, R1-1813222, Nov. 2018, 7 pages.
Vivo, "Remaining Issues on Multiplexing Data with Different Transmission Durations" 3GPP TSG RAN WG1 Meeting 91, R1-1719798, Nov. 2017, 11 pages.
PCT/CN2019/096201 International Search Report, dated Apr. 20, 2020, 2 pages.
Indian Patent Application No. 202247007756, Office Action dated Jun. 27, 2022 6 pages.

* cited by examiner

METHOD FOR TRANSMITTING FEEDBACK INFORMATION, USER EQUIPMENT

CROSS REFERENCE TO RELATED APPLICATIONS

This application is the U.S. national phase application based on International Application No. PCT/CN2019/096201, filed Jul. 16, 2019, the content of which is incorporated herein by reference for all purposes.

TECHNICAL FIELD

The disclosure relates to a field of communication technologies, and more particularly to a method for transmitting feedback information, a user equipment, and a base station.

BACKGROUND

In New Radio (hereinafter referred to as NR) of 5th Generation Mobile Communication Technology (hereinafter referred to as 5G), Ultra reliable and low latency communication (hereinafter referred to as URLLC) service is a very important type of service, which will be widely applied in 5G scenes, such as, Factory Automation, Remote Control, Augmented Reality (hereinafter referred to as AR), or Virtual Reality (hereinafter referred to as VR). The URLLC service usually requires very high reliability and very low latency. Another type of service is a type of enhanced mobile broadband (hereinafter referred to as eMBB) service, which usually requires a relatively high rate, but does not require a very low latency and a very low error rate. Therefore, the URLLC service type has a higher priority level in comparison.

However, a same terminal concurrently has the URLLC service and the eMBB service. When the URLLC service and the eMBB service are scheduled on a same carrier, or when User Equipment (hereinafter referred to as UE) processes the URLLC service and the eMBB service via a same transceiver link, it is very possible that a transmission conflict occurs between URLLC data and Hybrid Automatic Repeat request acknowledgement (hereinafter referred to as HARQ-ACK) of the eMBB. At this time, it is possible to transmit the URLLC data first to ensure characteristics of the high reliability and the low latency of the URLLC service. Therefore, the HARQ-ACK of the eMBB will be punctured or discarded.

However, for a transmission of the eMBB, due to its requirement for latency is not high, HARQ-ACKs of multiple eMBB Physical Downlink Shared Channels (hereinafter referred to as PDSCH) may be combined into a HARQ-ACK Codebook for transmitting. When the HARQ-ACK codebook is punctured or discarded because of the transmission of the URLLC, it will cause a large amount of eMBB data to be retransmitted.

SUMMARY

According to a first aspect of embodiments of the disclosure, there is provided a method for transmitting feedback information, applicable for a user equipment (UE). The method includes:
after a preset duration during which a transmission conflict occurs between feedback information for data of first service and data of second service, receiving first downlink control information (DCI) sent by a base station, in which a priority level of the first service is lower than a priority level of the second service;
obtaining a transmission resource for retransmitting the feedback information for the data of first service from the first DCI; and
retransmitting the feedback information for the data of first service through the transmission resource.

According to a second aspect of embodiments of the disclosure, there is provided a method for transmitting feedback information applicable for a base station. The method includes:
after a preset duration during which a transmission conflict occurs between feedback information for data of first service and data of second service, indicating a transmission resource for retransmitting the feedback information for the data of first service in first downlink control information (DCI) sent to a user equipment (UE), in which a priority level of the first service is lower than a priority level of the second service; and
receiving the feedback information for the data of first service retransmitted by the UE through the transmission resource.

According to a third aspect according to embodiments of the disclosure, there is provided a user equipment. The user equipment includes:
a processor; and
a memory, configured to store instructions executable by the processor,
in which the processor is configured to:
after a preset duration during which a transmission conflict occurs between feedback information for data of first service and data of second service, receive first downlink control information (DCI) sent by a base station, in which a priority level of the first service is lower than a priority level of the second service; and
obtain a transmission resource for retransmitting the feedback information for the data of first service from the first DCI; and
retransmit the feedback information for the data of first service through the transmission resource.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the disclosure as described in the appended claims.

Figure 1:
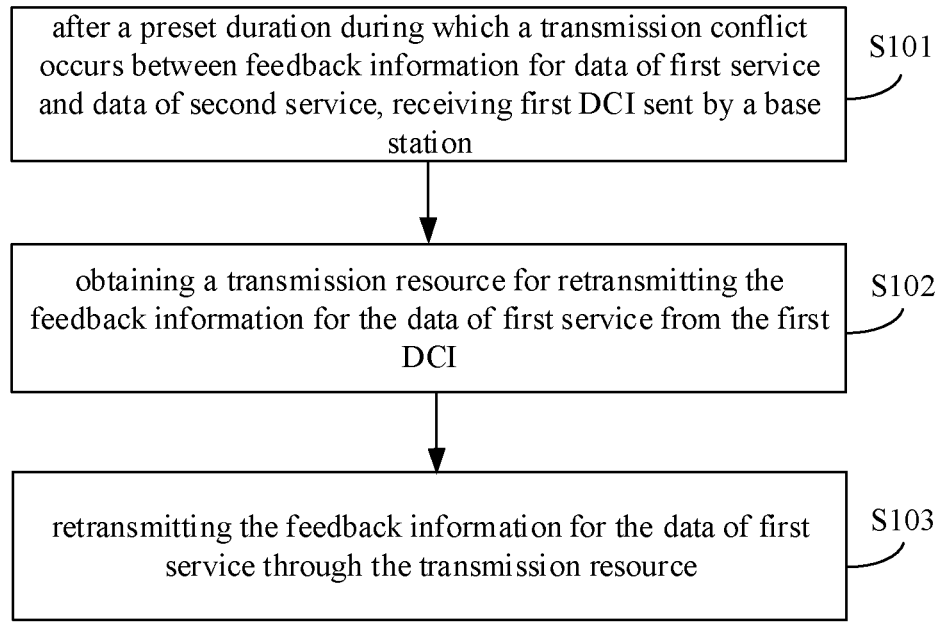
FIG. 1 is a flow chart illustrating a method for transmitting feedback information according to an exemplary embodiment.

FIG. 1 is a flow chart illustrating a method for transmitting feedback information according to an exemplary embodiment. This embodiment is described from a side of user equipment UE. As illustrated in FIG. 1, the method for transmitting feedback information includes the following blocks.

At block S101, after a preset duration during which a transmission conflict occurs between feedback information for data of first service and data of second service, first downlink control information (hereinafter referred to as DCI) sent by a base station is received. A priority level of the first service is lower than a priority level of the second service.

The first service may include, but be not limited to, eMBB service. The second service may include, but be not limited to, URLLC service. The preset duration is greater than or equal to a duration during which both the UE and the base station may determine that the transmission conflict occurs between the feedback information for the data of first service and the data of second service.

The transmission conflict occurring between the feedback information for the data of first service and the data of second service may include, but be not limited to, the following situations.

In situation 1), the transmission conflict occurs between the feedback information for the data of first service and data of second service transmitted via a semi-persistent configured physical uplink shared channel (PUSCH) resource.

In this situation, the UE may determine that the feedback information for the data of first service is currently in conflict when the transmission conflict occurs between the feedback information for the data of first service and the data of second service. However, the base station may determine that the feedback information for the data of first service is currently in conflict after blind checking whether the semi-persistent configured PUSCH resource is currently transmitted. Therefore, the base station may require a period of time T1 to determine that the transmission conflict occurs between the feedback information for the data of first service and the data of second service. The T1 is a duration for the base station demodulating the PUSCH resource. That is, the preset duration is greater than or equal to a first duration for the base station demodulating the PUSCH resource.

In situation 2), the transmission conflict occurs between the feedback information for the data of first service and data of second service transmitted via a semi-persistent configured scheduling request (SR) resource.

This situation is similar to Situation 1). The UE may determine that the conflict has occurred when the transmission conflict occurs, but the base station requires a period of time T2 to determine the conflict has occurred. The T2 is a duration for the base station demodulating the SR resource. That is, the preset duration is greater than or equal to a second duration for the base station demodulating the SR resource.

In situation 3), the transmission conflict occurs between the feedback information for the data of first service and feedback information for the data of second service.

In a case that the feedback information for the data of second service corresponds to a HARQ-ACK of a dynamically scheduled physical downlink shared channel (PDSCH), the base station may determine a conflict being about to occur when sending a DCI of second service, and the UE may determine a conflict being about to occur after completing demodulation of the DCI of the second service. At this time, a time when the UE and the base station determine that the conflict occurs is earlier than a time when the conflict actually occurs, but a time when the UE determines that the conflict occurs is later than a time when the base station determines that the conflict occurs. It is seen that, in this case, the preset duration is a third duration, and the third duration is greater than or equal to 0.

In a case that the feedback information for the data of second service corresponds to a HARQ-ACK of a semi-persistent configured PDSCH, the base station may determine a conflict being about to occur when sending a PDSCH of second service, and the UE may determine a conflict being about to occur after completing demodulation of the PDSCH of the second service. At this time, the time when the UE and the base station determine that the conflict occurs is earlier than the time when the conflict actually occurs, but the time when the UE determines that the conflict occurs is later than the time when the base station determines that the conflict occurs. It is seen that, in this case, the preset duration is a third duration, and the third duration is greater than or equal to 0.

In situation 4), the transmission conflict occurs between the feedback information for the data of first service and data of second service transmitted via a dynamic scheduled PUSCH resource.

This situation is similar to situation 3). The base station may determine the conflict being about to occur when sending uplink (UL) grant of second service, and the UE determines the conflict being about to occur after blind checking the UL grant. That is, the time when the UE and the base station determine that the conflict occurs is earlier than the time when the conflict actually occurs, but the time when the UE determines that the conflict occurs is later than the time when the base station determines that the conflict occurs. It is seen that, in this case, the preset duration is a fourth duration, and the fourth duration is greater than or equal to 0.

It is seen that, for different transmission conflict situations, there are different durations during which both the UE and the base station may determine the conflict being about to occur or having occurred.

In this embodiment, the preset duration may be set respectively according to different conflict situations, or may be selected as a fixed value according to all possible conflict situations. The fixed value is a maximum value in preset durations of all situations, e.g., a maximum value in the first duration, the second duration, the third duration and the fourth duration.

Alternatively, the method may also include: agreeing the preset duration in communication protocol, or may also include: receiving a high-layer signaling sent by the base station; and obtaining the preset duration parsed from the high-layer signaling.

At block S102, a transmission resource for retransmitting the feedback information for the data of first service is obtained from the first DCI.

The DCI may include downlink (DL) grant information, which is configured to schedule a PDSCH for transmission of downlink data of the first service and a corresponding PUCCH. In this case, obtaining the transmission resource for retransmitting the feedback information for the data of first service from the first DCI may include: obtaining a PUCCH resource for retransmitting the feedback information for the data of first service from first downlink scheduling information.

The DCI may include uplink (UL) grant information, which is configured to schedule a PUSCH for uplink data transmission of the first service. In this case, obtaining the transmission resource for retransmitting the feedback information for the data of first service from the first DCI may include: obtaining a PUSCH resource for retransmitting the feedback information for the data of first service from first uplink scheduling information.

At block S103, the feedback information for the data of first service is retransmitted through the transmission resource.

After obtaining the transmission resource for retransmitting the feedback information for the data of first service from the first DCI, the feedback information for the data of first service is retransmitted through the transmission resource.

In the above embodiments, after the preset duration during which the transmission conflict occurs between the feedback information for the data of first service and the data of second service, the first DCI sent by the base station is received, the transmission resource for retransmitting the feedback information for the data of first service is obtained from the first DCI, and the feedback information for the data of first service is retransmitted through the transmission resource. Therefore, it solves a problem of retransmitting the feedback information for the data of first service after puncturing or discarding the feedback information for the data of first service in a scene for hybrid transmission of the data of first service and the data of second service, so as to avoid unnecessary retransmission of the PDSCH of first service by the base station.

Figure 2:
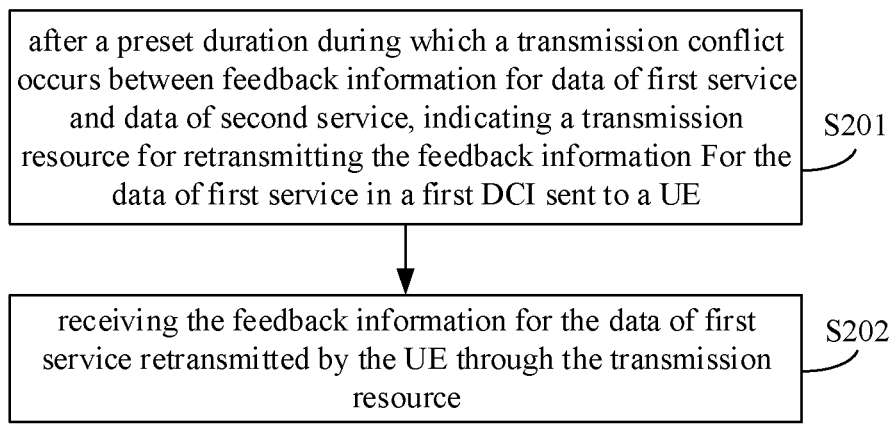
FIG. 2 is a flow chart illustrating a method for transmitting feedback information according to another exemplary embodiment.

FIG. 2 is a flow chart illustrating a method for transmitting feedback information according to another exemplary embodiment. This embodiment is applicable for a base station. As illustrated in FIG. 2, the method includes the following blocks.

At block S201: after a preset duration during which a transmission conflict occurs between feedback information for data of first service and data of second service, a transmission resource for retransmitting the feedback information for the data of first service is indicated in first DCI sent to the UE. A priority level of the first service is lower than a priority level of the second service.

The first service may include, but be not limited to, eMBB service. The second service may include, but be not limited to, URLLC service. The preset duration is greater than or equal to a duration during which both the UE and the base station may determine that the transmission conflict occurs between the feedback information for the data of first service and the data of second service.

The transmission conflict occurring between feedback information for the data of first service and the data of second service may include, but be not limited to, the following situations.

In situation 1), the transmission conflict occurs between the feedback information for the data of first service and data of second service transmitted via a semi-persistent configured physical uplink shared channel (PUSCH) resource.

In this situation, the UE may determine that the feedback information for the data of first service is currently in conflict when the transmission conflict occurs between the feedback information for the data of first service and the data of second service. However, the base station may determine that the feedback information for the data of first service is currently in conflict after blind checking whether the semi-persistent configured PUSCH resource is currently transmitted. Therefore, the base station may require a period of time T1 to determine that the feedback information for the data of first service is in conflict with the data of second service. The T1 is a duration for the base station demodulating the PUSCH resource. That is, the preset duration is greater than or equal to a first duration for the base station demodulating the PUSCH resource.

In situation 2), the transmission conflict occurs between the feedback information for the data of first service and data of second service transmitted via a semi-persistent configured scheduling request (SR) resource.

This situation is similar to Situation 1). The UE may determine that the conflict has occurred when the transmission conflict occurs, but the base station requires a period of time T2 to determine the conflict has occurred. The T2 is a duration for the base station demodulating the SR resource. That is, the preset duration is greater than or equal to a second duration for the base station demodulating the SR resource.

In situation 3), the transmission conflict occurs between the feedback information for the data of first service and feedback information for the data of second service.

In a case that the feedback information for the data of second service corresponds to a HARQ-ACK of dynamically scheduled physical downlink shared channel (PDSCH), the base station may determine a conflict being about to occur when sending a DCI of second service, and the UE may determine a conflict being about to occur after completing demodulation of the DCI of second service. At this time, a time when the UE and the base station determine that the conflict occurs is earlier than a time when the conflict actually occurs, but a time when the UE determines that the conflict occurs is later than a time when the base station determines that the conflict occurs. It is seen that, in this case, the preset duration is a third duration, and the third duration is greater than or equal to 0.

In a case that the feedback information for the data of second service corresponds to a HARQ-ACK of a semi-persistent configured PDSCH, the base station may determine a conflict being about to occur when sending a PDSCH of second service, and the UE may determine a conflict being about to occur after completing demodulation of the PDSCH of the second service. At this time, the time when the UE and the base station determine that the conflict occurs is earlier than the time when the conflict actually occurs, but the time when the UE determines that the conflict occurs is later than the time when the base station determines that the conflict occurs. It is seen that, in this case, the preset duration is a third duration, and the third duration is greater than or equal to 0.

In situation 4), the transmission conflict occurs between the feedback information for the data of first service and data of second service transmitted via a dynamic scheduled PUSCH resource.

This situation is similar to situation 3). The base station may determine the conflict being about to occur when sending uplink (UL) grant of second service, and the UE determines the conflict being about to occur after blind checking the UL grant. That is, the time when the UE and the base station determine that the conflict occurs is earlier than the time when the conflict actually occurs, but the time when the UE determines that the conflict occurs is later than the time when the base station determines that the conflict occurs It is seen that, in this case, the preset duration is a fourth duration, and the fourth duration is greater than or equal to 0.

It is seen that, for different transmission conflict situations, there are different durations during which both the UE and the base station may determine the conflict being about to occur or having occurred.

In this embodiment, the preset duration may be set respectively according to different conflict situations, or may be selected as a fixed value according to all possible conflict situations. The fixed value is a maximum value in preset durations of all situations, e.g., a maximum value in the first duration, the second duration, the third duration and the fourth duration.

Alternatively, the method may also include: agreeing the preset duration in communication protocol, or may also include: configuring the preset duration for the UE and sending a high-layer signaling to the UE. The high-layer signaling carries the preset duration.

At block S202, the feedback information for the data of first service retransmitted by the UE through the transmission resource is received.

In this embodiment, the base station indicates the transmission resource for retransmitting the feedback information for the data of first service in the first DCI sent to the UE after the preset duration during which the transmission conflict occurs between the feedback information for the data of first service and the data of second service. The UE receives the first DCI, and then obtains the transmission resource for retransmitting the feedback information for the data of first service from the first DCI, and retransmits the feedback information for the data of first service through the transmission resource.

The DCI may include downlink (DL) grant information, which is configured to schedule a PDSCH for transmission of downlink data of the first service and a corresponding PUCCH. In this case, a manner for indicating the transmission resource for retransmitting the feedback information for the data of first service in the first DCI sent to the UE may include: indicating a PUCCH resource for retransmitting the feedback information for the data of first service in first downlink scheduling information sent to the UE.

The DCI may include uplink (UL) grant information, which is configured to schedule a PUSCH for transmission of uplink data of the first service. In this case, a manner for indicating the transmission resource for retransmitting the feedback information for the data of first service in the first DCI sent to the UE may include: indicating a PUSCH resource for retransmitting the feedback information for the data of first service in first uplink scheduling information sent to the UE.

In the above embodiment, after the preset duration during which the transmission conflict occurs between the feedback information for the data of first service and the data of second service, the transmission resource for retransmitting the feedback information for the data of first service is indicated in the first DCI sent to the UE. The feedback information for the data of first service retransmitted by the UE through the transmission resource is received. Therefore, the base station may determine a transmission situation of the data of first service, so as to avoid unnecessary retransmission of the PDSCH of first service.

Figure 3:
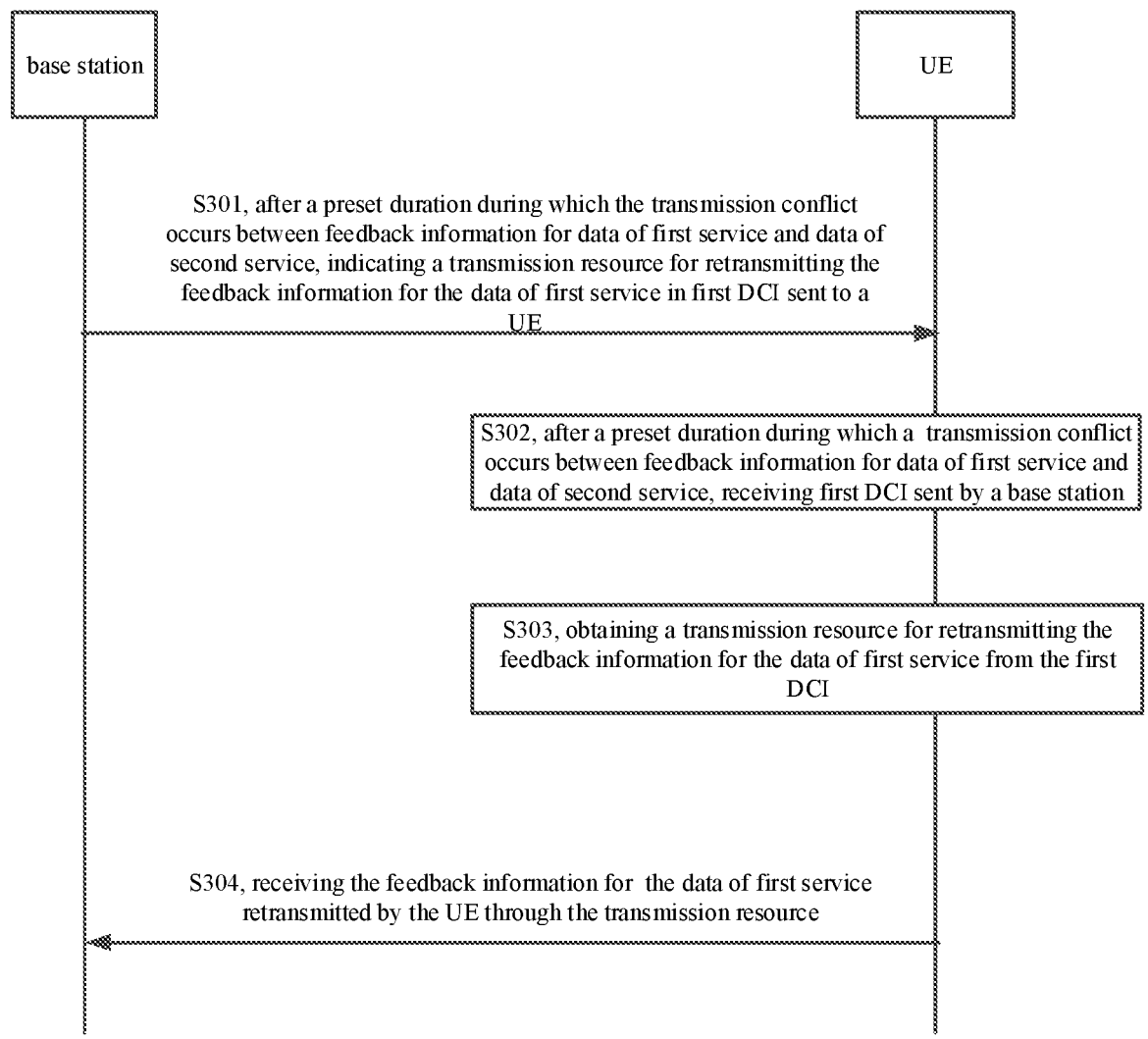
FIG. 3 is a signaling flow chart illustrating a method for transmitting feedback information according to an exemplary embodiment.

FIG. 3 is a signaling flow chart illustrating a method for transmitting feedback information according to an exemplary embodiment. The embodiment is described from point of view of interaction between a base station and a UE. As illustrated in FIG. 3, the method includes the following blocks.

At block S301, after a preset duration during which a transmission conflict occurs between feedback information for data of first service and data of second service, the base station configures a transmission resource for retransmitting the feedback information for the data of first service in first DCI sent to the UE. A priority level of the first service is lower than a priority level of the second service.

In this embodiment, the feedback information for the data of first service is HARQ-ACK of eMBB data, and the data of second service is URLLC data.

The DCI may be downlink scheduling information or uplink scheduling information. In a case that there is no PDSCH to be transmitted at this time, the uplink scheduling information may be used preferably.

At block S302, the UE receives the first DCI sent by the base station after the preset duration during which the transmission conflict occurs between the feedback information for the data of first service and the data of second service.

At block S303, the UE obtains a transmission resource for retransmitting the feedback information for the data of first service from the first DCI.

At block S304, the base station receives the feedback information for the data of first service retransmitted by the UE through the transmission resource.

In the above embodiment, with the interaction between the base station and the UE, the base station configures the transmission resource for retransmitting the feedback information for the data of first service in the first DCI sent to the UE after the preset duration during which the transmission conflict occurs between the feedback information for the data of first service and the data of second service, and receives the feedback information for the data of first service retransmitted by the UE through the transmission resource. Therefore, the base station may determine a transmission situation of the data of first service, so as to avoid unnecessary retransmission of the PDSCH of first service.

Figure 4:
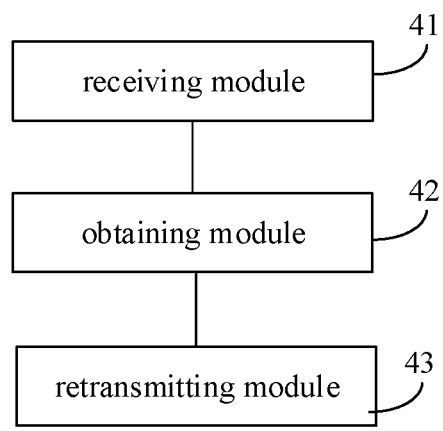
FIG. 4 is a block diagram illustrating an apparatus for transmitting feedback information according to an exemplary embodiment.

FIG. 4 is a block diagram illustrating an apparatus for transmitting feedback information according to an exemplary embodiment. The apparatus is provided in a UE. As illustrated in FIG. 4, the apparatus includes a receiving module 41, an obtaining module 42 and a retransmission module 43.

The receiving module 41 is configured to, after a preset duration during which a transmission conflict occurs between feedback information for data of first service and data of second service, receive first downlink control information DCI sent by a base station. A priority level of the first service is lower than a priority level of the second service.

The first service may include, but be not limited to, eMBB service. The second service may include, but be not limited to, URLLC service. The preset duration is greater than or equal to a duration during which both the UE and the base station may determine that the transmission conflict occurs between the feedback information for the data of first service and the data of second service.

The transmission conflict occurring between the feedback information for the data of first service and the data of second service may include, but be not limited to, the following situations.

In situation 1), the transmission conflict occurs between the feedback information for the data of first service and data of second service transmitted via a semi-persistent configured physical uplink shared channel (PUSCH) resource.

In this situation, the UE may determine that the feedback information for the data of first service is currently in conflict when the transmission conflict occurs between the feedback information for the data of first service and the data of second service. However, the base station may determine that the feedback information for the data of first service is currently in conflict after blind checking whether the semi-persistent configured PUSCH resource is currently transmitted. Therefore, the base station may require a period of time T1 to determine that the feedback information for the data of first service is in conflict with the data of second service. The T1 is a duration for the base station demodulating the PUSCH resource. That is, the preset duration is greater than or equal to a first duration for the base station demodulating the PUSCH resource.

In situation 2), the transmission conflict occurs between the feedback information for the data of first service and data of second service transmitted via a semi-persistent configured scheduling request (SR) resource.

This situation is similar to Situation 1). The UE may determine that the conflict has occurred when the transmission conflict occurs, but the base station requires a period of time T2 to determine the conflict has occurred. The T2 is a duration for the base station demodulating the SR resource. That is, the preset duration is greater than or equal to a second duration for the base station demodulating the SR resource.

In situation 3), the transmission conflict occurs between the feedback information for the data of first service and feedback information for the data of second service.

In a case that the feedback information for the data of second service corresponds to a HARQ-ACK of a dynamically scheduled physical downlink shared channel (PDSCH), the base station may determine a conflict being about to occur when sending a DCI of second service, and the UE may determine a conflict being about to occur after completing demodulation of the DCI of second service. At this time, a time when the UE and the base station determine that the conflict occurs is earlier than a time when the conflict actually occurs, but a time when the UE determines that the conflict occurs is later than a time when the base station determines that the conflict occurs. It is seen that, in this case, the preset duration is a third duration, and the third duration is greater than or equal to 0.

In a case that the feedback information for the data of second service corresponds to a HARQ-ACK of a semi-persistent configured PDSCH, the base station may determine a conflict being about to occur when sending a PDSCH of second service, and the UE may determine a conflict being about to occur after completing demodulation of the PDSCH of second service. At this time, the time when the UE and the base station determine that the conflict occurs is earlier than the time when the conflict actually occurs, but the time when the UE determines that the conflict occurs is later than the time when the base station determines that the conflict occurs. It is seen that, in this case, the preset duration is a third duration, and the third duration is greater than or equal to 0.

In situation 4), the transmission conflict occurs between the feedback information for the data of first service and data of second service transmitted via a dynamic scheduled PUSCH resource.

This situation is similar to situation 3). The base station may determine the conflict being about to occur when sending uplink (UL) grant of second service, and the UE determines the conflict being about to occur after blind checking the UL grant. That is, the time when the UE and the base station determine that the conflict occurs is earlier than the time when the conflict actually occurs, but the time when the UE determines that the conflict occurs is later than the time when the base station determines that the conflict occurs. It is seen that, in this case, the preset duration is a fourth duration, and the fourth duration is greater than or equal to 0.

It is seen that, for different transmission conflict situations, there are different durations during which both the UE and the base station may determine the conflict being about to occur or having occurred.

In this embodiment, the preset duration may be set respectively according to different conflict situations, or may be selected as a fixed value according to all possible conflict situations. The fixed value is a maximum value in preset durations of all situations, e.g., a maximum value in the first duration, the second duration, the third duration and the fourth duration.

The obtaining module 42 is configured to obtain a transmission resource for retransmitting the feedback information for the data of first service from the first DCI received by the receiving module 41.

The DCI may include downlink (DL) grant information, which is configured to schedule a PDSCH for transmission of downlink data of the first service and a corresponding PUCCH. In this case, obtaining the transmission resource for retransmitting the feedback information for the data of first service from the first DCI may include: obtaining a PUCCH resource for retransmitting the feedback information for the data of first service from first downlink scheduling information.

The DCI may include uplink (UL) grant information, which is configured to schedule a PUSCH for transmission of uplink data of the first service. In this case, obtaining the transmission resource for retransmitting the feedback information for the data of first service from the first DCI may include: obtaining a PUSCH resource for retransmitting the feedback information for the data of first service from first uplink scheduling information.

The retransmitting module 43 is configured to retransmit the feedback information for the data of first service through the transmission resource obtained by the obtaining module 42.

After obtaining the transmission resource for retransmitting the feedback information for the data of first service from the first DCI, the feedback information for the data of first service is retransmitted through the transmission resource.

In the above embodiments, after the preset duration during which the transmission conflict occurs between the feedback information for the data of first service and the data of second service, the first DCI sent by the base station is received, the transmission resource for retransmitting the feedback information for the data of first service is obtained from the first DCI, and the feedback information for the data of first service is retransmitted through the transmission resource. Therefore, it solves a problem of retransmitting the feedback information for the data of first service after puncturing or discarding the feedback information for the data of first service in a scene for hybrid transmission of the data of first service and the data of second service, so as to avoid unnecessary retransmission of the PDSCH of first service by the base station.

Figure 5:
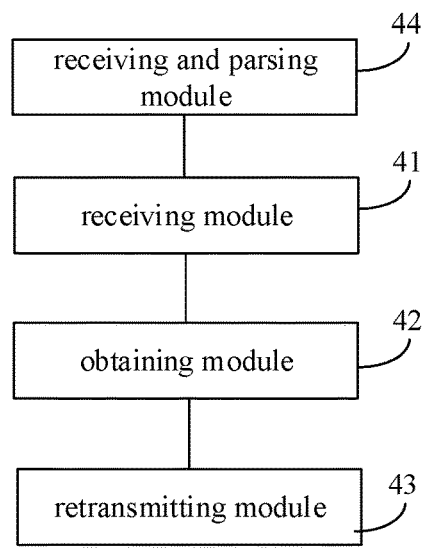
FIG. 5 is a block diagram illustrating an apparatus for transmitting feedback information according to another exemplary embodiment.

FIG. 5 is a block diagram illustrating an apparatus for transmitting feedback information according to another exemplary embodiment. As illustrated in FIG. 5, on the basic of the foregoing embodiment illustrated in FIG. 4, the apparatus may further include a receiving and parsing module 44.

The receiving and parsing module 44 is configured to receive a high-layer signaling sent by the base station, and obtain the preset duration parsed from the high-layer signaling.

In the embodiment, the preset duration parsed from the received high-layer signaling is obtained, which is simple to implement.

Figure 6:
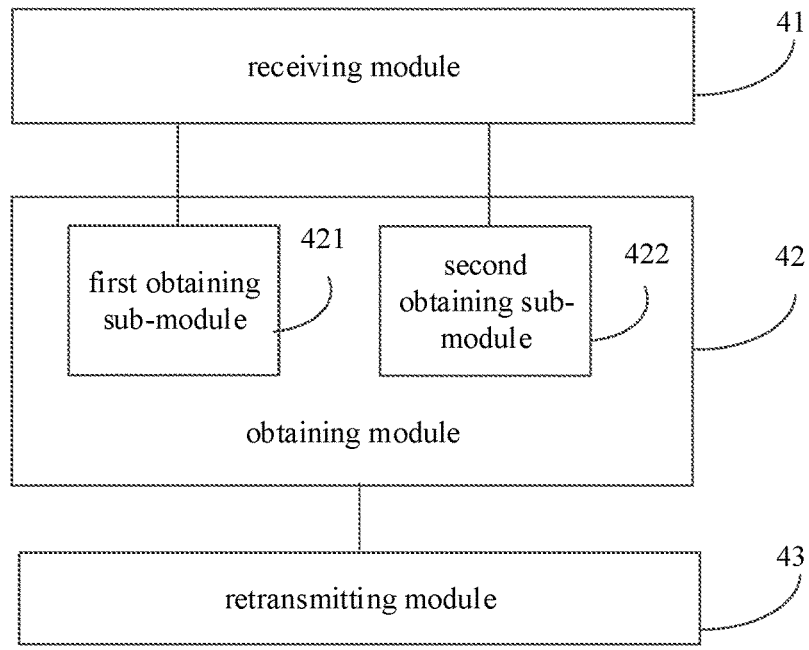
FIG. 6 is a block diagram illustrating an apparatus for transmitting feedback information according to another exemplary embodiment.

FIG. 6 is a block diagram illustrating an apparatus for transmitting feedback information according to another exemplary embodiment. As illustrated in FIG. 6, on the basic of the foregoing embodiment illustrated in FIG. 4, the obtaining module 42 may include a first obtaining sub-module 421 or a second obtaining sub-module 422.

The first obtaining sub-module 421 is configured to obtain the PUCCH resource for retransmitting the feedback information for the data of first service from the first downlink scheduling information.

The second obtaining sub-module 422 is configured to obtain the PUSCH resource for retransmitting the feedback information for the data of first service from the first uplink scheduling information.

In the embodiment, the PUCCH resource for retransmitting the feedback information for the data of first service is obtained from the first downlink scheduling information, or the PUSCH resource for retransmitting the feedback information for the data of first service is obtained from the first uplink scheduling information, which is flexible and diverse to implement.

Figure 7:
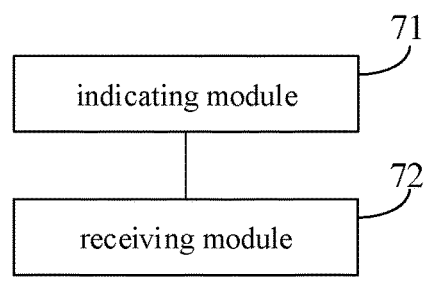
FIG. 7 is a block diagram illustrating an apparatus for transmitting feedback information according to another exemplary embodiment.

FIG. 7 is a block diagram illustrating an apparatus for transmitting feedback information according to another exemplary embodiment. The apparatus may be provided in a base station. As illustrated in FIG. 7, the apparatus may include an indicating module 71 and a receiving module 72.

The indicating module 71 is configured to, after a preset duration during which a transmission conflict occurs between feedback information for data of first service and data of second service, indicate a transmission resource for retransmitting the feedback information for the data of first service in first DCI sent to a UE. A priority level of the first service is lower than a priority level of the second service.

The first service may include, but be not limited to, eMBB service. The second service may include, but be not limited to, URLLC service. The preset duration is greater than or equal to a duration during which both the UE and the base station may determine that the transmission conflict occurs between the feedback information for the data of first service and the data of second service.

The transmission conflict occurs between feedback information for the data of first service and the data of second service may include, but be not limited to, the following situations.

In situation 1), the transmission conflict occurs between the feedback information for the data of first service and data of second service transmitted via a semi-persistent configured physical uplink shared channel (PUSCH) resource.

In this situation, the UE may determine that the feedback information for the data of first service is currently in conflict when the transmission conflict occurs between the feedback information for the data of first service and the data of second service. However, the base station may determine that the feedback information for the data of first service is currently in conflict after blind checking whether the semi-persistent configured PUSCH resource is currently transmitted. Therefore, the base station may require a period of time T1 to determine that the feedback information for the data of first service is in conflict with the data of second service. The T1 is a duration for the base station demodulating the PUSCH resource. That is, the preset duration is greater than or equal to a first duration for the base station demodulating the PUSCH resource.

In situation 2), the transmission conflict occurs between the feedback information for the data of first service and data of second service transmitted via a semi-persistent configured scheduling request (SR) resource.

This situation is similar to Situation 1). The UE may determine that the conflict has occurred when the transmission conflict occurs, but the base station requires a period of time T2 to determine the conflict has occurred. The T2 is a duration for the base station demodulating the SR resource. That is, the preset duration is greater than or equal to a second duration for the base station demodulating the SR resource.

In situation 3), the transmission conflict occurs between the feedback information for the data of first service and feedback information for the data of second service.

In a case that the feedback information for the data of second service corresponds to a HARQ-ACK of dynamically scheduled physical downlink shared channel (PDSCH), the base station may determine a conflict being about to occur when sending a DCI of second service, and the UE may determine a conflict being about to occur after completing demodulation of the DCI of second service. At this time, a time when the UE and the base station determine that the conflict occurs is earlier than a time when the conflict actually occurs, but a time when the UE determines that the conflict occurs is later than a time when the base station determines that the conflict occurs. It is seen that, in this case, the preset duration is a third duration, and the third duration is greater than or equal to 0.

In a case that the feedback information for the data of second service corresponds to a HARQ-ACK of a semi-persistent configured PDSCH, the base station may determine a conflict being about to occur when sending a PDSCH of second service, and the UE may determine a conflict being about to occur after completing demodulation of the PDSCH of the second service. At this time, the time when the UE and the base station determine that the conflict occurs is earlier than the time when the conflict actually occurs, but the time when the UE determines that the conflict occurs is later than the time when the base station determines that the conflict occurs. It is seen that, in this case, the preset duration is a third duration, and the third duration is greater than or equal to 0.

In situation 4), the transmission conflict occurs between the feedback information for the data of first service and data of second service transmitted via a dynamic scheduled PUSCH resource.

This situation is similar to situation 3). The base station may determine the conflict being about to occur when sending uplink (UL) grant of second service, and the UE determines the conflict being about to occur after blind checking the UL grant. That is, the time when the UE and the base station determine that the conflict occurs is earlier than the time when the conflict actually occurs, but the time when the UE determines that the conflict occurs is later than the time when the base station determines that the conflict occurs. It is seen that, in this case, the preset duration is a fourth duration, and the fourth duration is greater than or equal to 0.

It is seen that, for different transmission conflict situations, there are different durations during which both the UE and the base station may determine the conflict being about to occur or having occurred.

In this embodiment, the preset duration may be set respectively according to different conflict situations, or may be selected as a fixed value according to all possible conflict situations. The fixed value is a maximum value in preset durations of all situations, e.g., a maximum value in the first duration, the second duration, the third duration and the fourth duration.

The receiving module 72 is configured to receive the feedback information for the data of first service retransmitted by the UE through the transmission resource indicated by the indicating module.

In this embodiment, the base station indicates the transmission resource for retransmitting the feedback information for the data of first service in the first DCI sent to the UE after the preset duration during which the transmission conflict occurs between the feedback information for the data of first service and the data of second service. The UE receives the first DCI, and then obtains the transmission resource for retransmitting the feedback information for the data of first service from the first DCI, and retransmits the feedback information for the data of first service through the transmission resource.

The DCI may include downlink (DL) grant information, which is configured to schedule a PDSCH for transmission of downlink data of the first service and a corresponding PUCCH. In this case, a manner for indicating the transmission resource for retransmitting the feedback information for the data of first service in the first downlink control information DCI sent to the UE may include: indicating a PUCCH resource for retransmitting the feedback information for the data of first service in first downlink scheduling information sent to the UE.

The DCI may include uplink (UL) grant information, which is configured to schedule a PUSCH for transmission of uplink data of the first service. In this case, a manner for indicating the transmission resource for retransmitting the feedback information for the data of first service in the first DCI sent to the UE may include: indicating a PUSCH resource for retransmitting the feedback information for the data of first service in first uplink scheduling information sent to the UE.

In the above embodiment, after the preset duration during which the transmission conflict occurs between the feedback information for the data of first service and the data of second service, the transmission resource for retransmitting the feedback information for the data of first service is indicated in the first DCI sent to the UE. The feedback information for the data of first service retransmitted by the UE through the transmission resource is received. Therefore, the base station may determine a transmission situation of the data of first service, so as to avoid unnecessary retransmission of the PDSCH of first service.

Figure 8:
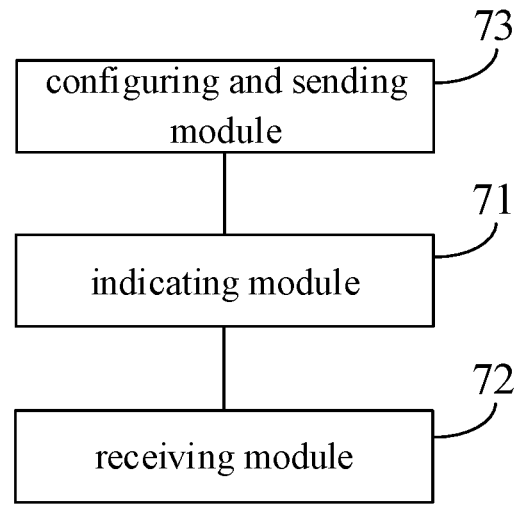
FIG. 8 is a block diagram illustrating an apparatus for transmitting feedback information according to another exemplary embodiment.

FIG. 8 is a block diagram illustrating an apparatus for transmitting feedback information according to another exemplary embodiment. As illustrated in FIG. 8, on the basic of the foregoing embodiment illustrated in FIG. 7, the apparatus may further include a configuring and sending module 73.

The configuring and sending module 73 is configured to configure the preset duration for the UE and send a high-layer signaling to the UE. The high-layer signaling carries the preset duration.

In the embodiment, the high-layer signaling carrying the preset duration is sent to the UE, to enable the UE to obtain the preset duration, which is simple to implement.

Figure 9:
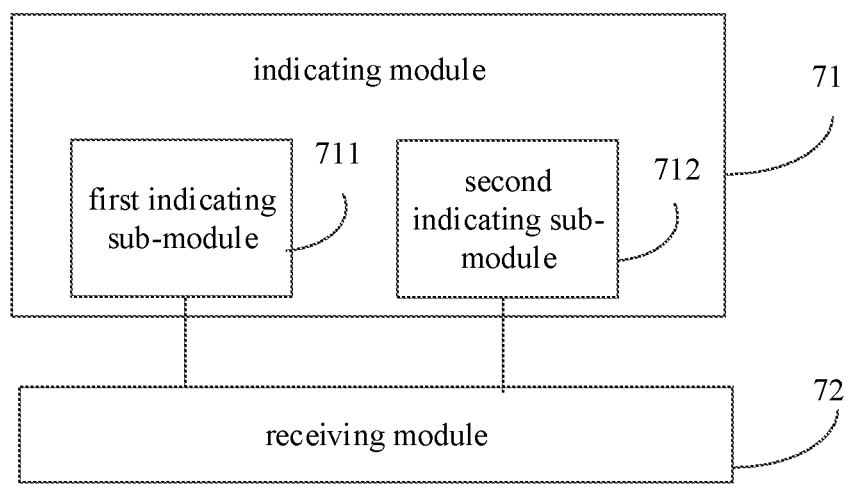
FIG. 9 is a block diagram illustrating an apparatus for transmitting feedback information according to another exemplary embodiment.

FIG. 9 is a block diagram illustrating an apparatus for transmitting feedback information according to another exemplary embodiment. As illustrated in FIG. 9, on the basic of the foregoing embodiment illustrated in FIG. 7, the indicating module 71 may include a first indicating sub-module 711 or a second indicating sub-module 712.

The first indicating sub-module 711 is configured to indicate the physical uplink control channel PUCCH resource for retransmitting the feedback information for the data of first service in the first downlink scheduling information sent to the user equipment UE.

The second indicating sub-module 712 is configured to indicate the physical uplink shared channel PUSCH resource for retransmitting the feedback information for the data of first service in the first uplink scheduling information sent to the user equipment UE.

In the embodiment, the physical uplink control channel PUCCH resource for retransmitting the feedback information for the data of first service is indicated in the first downlink scheduling information sent to the user equipment UE, or the physical uplink shared channel PUSCH resource for retransmitting the feedback information for the data of first service is indicated in the first uplink scheduling information sent to the user equipment UE, which is flexible and diverse to implement.

Figure 10:
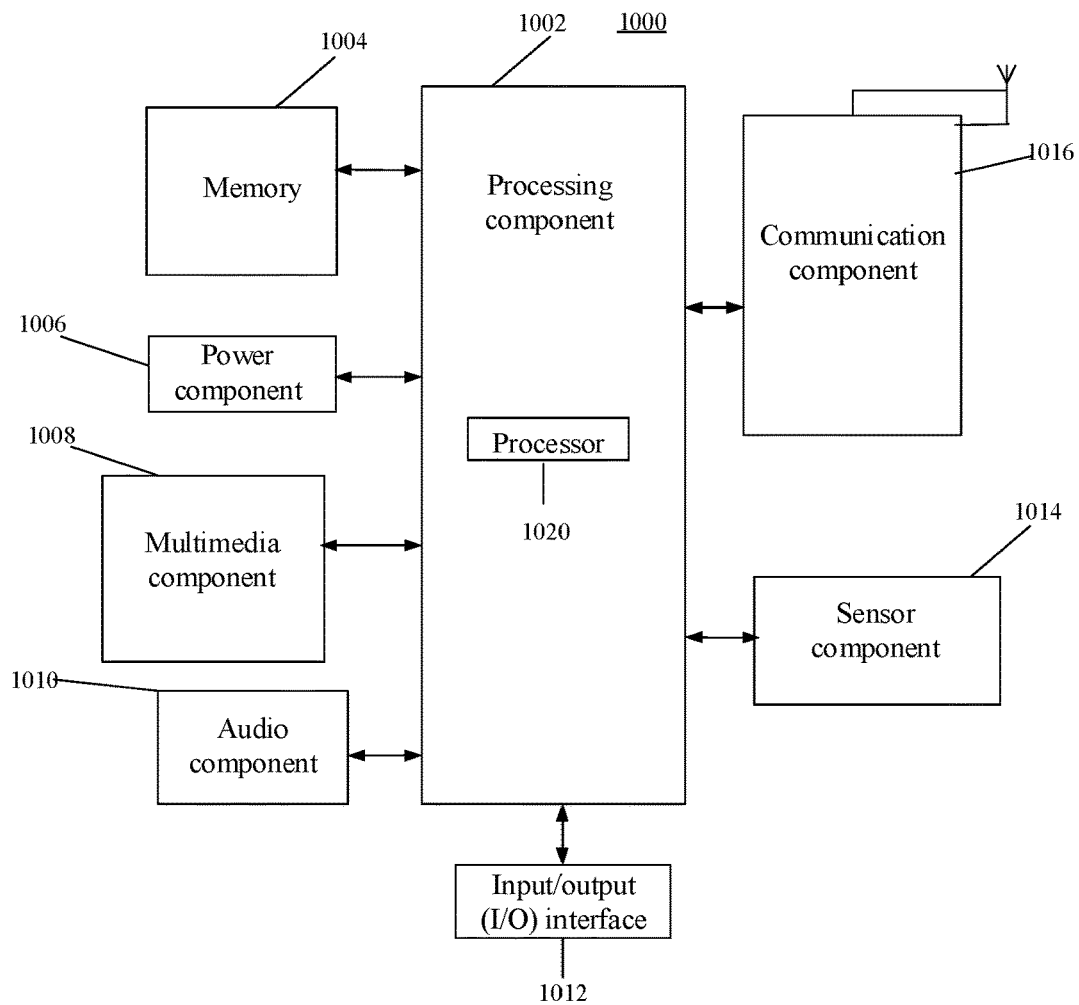
FIG. 10 is a block diagram illustrating a device applicable for transmitting feedback information according to an exemplary embodiment.

FIG. 10 is a block diagram illustrating a device applicable for transmitting feedback information according to an exemplary embodiment. For example, the device 1000 may be a user equipment such as a mobile phone, a computer, a digital broadcasting terminal, a message transceiving equipment, a game console, a tablet equipment, a medical equipment, a fitness equipment, or a personal digital assistant.

Referring to FIG. 10, the device 1000 may include one or more of: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1002 for executing instructions to implement all or a part of the above method. Moreover, the processing component 1002 may include one or more modules which facilitate the interaction between the processing component 1002 and other components. For example, the processing component 1002 may include a multimedia module to facilitate the interaction between the multimedia component 1008 and the processing component 1002.

A processor 1220 in the processing component 1202 may be configured to:

after a preset duration during which a transmission conflict occurs between feedback information for data of first service and data of second service, receive first downlink control information DCI sent by a base station. A priority level of the first service is lower than a priority level of the second service;

obtain a transmission resource for retransmitting the feedback information for the data of first service from the first DCI;

retransmit the feedback information for the data of first service through the transmission resource.

The memory 1004 is configured to store various types of data to support the operation of the device 1000. Examples of such data include instructions for any application or method operated on the device 1000 for performing contraction data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1006 is configured to provide power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1208 includes a front camera and/or a rear camera. When the device 1000 is in an operation mode, such as a shooting mode or a video mode, the front camera and/or the rear camera may receive external multimedia data. Each front camera and rear camera may be a fixed optical lens system or have a focal length and an optical zoom capability.

The audio component 1010 is configured to output and/or input an audio signal. For example, the audio component 1010 includes a microphone ("MIC") for receiving an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting the audio signal.

The I/O interface 1012 is configured to provide an interface between the processing component 1002 and peripheral interface modules, such as a keyboard, a click wheel, buttons, and the like. These buttons may include, but be not limited to, a home button, a volume button, a start button, and a lock button.

The sensor component 1014 includes one or more sensors for providing status assessments of various aspects of the device 1000. For example, the sensor component 1014 may detect an open/closed state of the device 1000, relative positioning of components, e.g., the display and the keypad of the device 1000, a position change of the device 1000 or a component of the device 1000, a presence or absence of user contraction with the device 1000, an orientation or an acceleration/deceleration of the device 1000, and a temperature change of the device 1000. The sensor component 1014 may include a proximity sensor configured to detect the presence of nearby objects without any physical contact. The sensor component 1014 may also include an optical sensor, such as a CMOS or CCD image sensor, for use in an imaging application. In some embodiments, the sensor component 1014 may also include an acceleration sensor, a gyro sensor, a magnetic sensor, a pressure sensor or a temperature sensor.

The communication component 1016 is configured to facilitate communication, wired or wirelessly, between the device 1000 and other devices. The device 1000 may access a wireless network based on a communication standard, such as Wi-Fi, 3Q or a combination thereof. In an exemplary embodiment, the communication component 1016 receives a broadcast signal or broadcast associated information from an external broadcast management system via a broadcast channel. In an exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer readable storage medium including instructions, such as the memory 1004 including the instructions. The instructions may be executed by the processor 1020 in the device 1000 for performing the above methods. For example, the non-transitory computer readable storage medium may be a ROM (read only memory), a random access memory (RAM), a CD-ROM (compact disc-ROM), a magnetic tape, a floppy disc, an optical data storage device, and the like.

Figure 11:
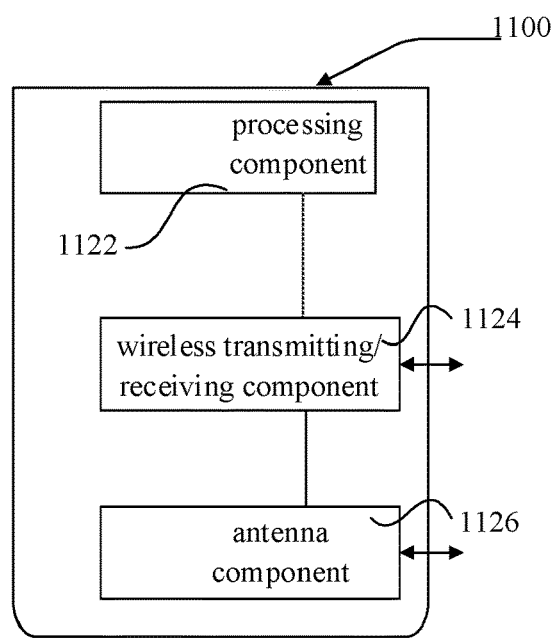
FIG. 11 is a block diagram illustrating a device applicable for transmitting feedback information according to another exemplary embodiment.

FIG. 11 is a block diagram illustrating a device applicable for transmitting feedback information according to another exemplary embodiment. The device 1100 may be provided as a base station. Referring to FIG. 11, the device 1100 includes a processing component 1122, a wireless transmitting/receiving component 1124, an antenna component 1126, and a signal processing part specific to a wireless interface. The processing component 1122 may further include one or more processors.

One or more processor in the processing component 1122 may be configured to:

after a preset duration during which a transmission conflict occurs between feedback information for data of first service and data of second service, indicate a transmission resource for retransmitting the feedback information for the data of first service in first downlink control information DCI sent to a user equipment UE. A priority level of the first service is lower than a priority level of the second service;

receive the feedback information for the data of first service retransmitted by the UE through the transmission resource.

In an exemplary embodiment, a non-transitory computer-readable storage medium including instructions is also provided. The instructions may be executed by the processing component 1122 of the device 1100 to implement the method for transmitting feedback information described above. For example, the non-transitory computer-readable storage medium may be a ROM (read only memory), a random access memory (RAM), a CD-ROM (compact disc-ROM), a magnetic tape, a floppy disk and an optical data storage device.

As for the apparatus embodiments, the apparatus embodiments basically correspond to the method embodiments, so please refer to partial description of the method embodiments for relevant points. The apparatus embodiments described above are only exemplary. The units described as separated components may or may not be physically separated. The components displayed as units may or may not be physical units, that is, the components may be located in a place or distributed to multiple network units. Some or all of the modules may be selected based on an actual need to achieve the purpose of embodiments. The skilled in this field may understand and implement the embodiments without creative labor.

It should be noted that, in the specification, relational terms such as "first" and "second" are only used to distinguish an entity or operation from another entity or operation, and do not necessarily require or imply any such actual relationship or order between these entities or operations. The terms "comprising", "including" or any other variation thereof are intended to cover non-exclusive inclusion, such that a process, method, article or equipment including a series of elements includes not only those elements, but also other elements not explicitly listed, or elements inherent to such process, method, article or equipment. Without further limitation, the element defined by the sentence "including one . . . " does not exclude that there are other identical elements in the process, method, article or equipment including the element.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that, the disclosure is not limited to the exaction construction that has been described above and illustrated in the accompanying drawings, and that various modifications and changes may be made without departing from the scope thereof. The scope of the disclosure only is limited by the appended claims.

What is claimed is:

1. A method for transmitting feedback information, implemented using a user equipment (UE), and comprising:
at a first time point with a preset time interval relative to a second time point of occurrence of a transmission conflict, obtaining a physical uplink control channel (PUCCH) resource for retransmitting feedback information for first service data, wherein the PUCCH resource is obtained from downlink scheduling information comprised in downlink control information (DCI) sent by a base station, and the transmission conflict is a transmission conflict occurring between the feedback information for the first service data and second service data;

retransmitting the feedback information for the first service data using the PUCCH resource.

2. The method according to claim 1, wherein
the first time point with the preset time interval relative to the second time point of occurrence of the transmission conflict is later than or equal to a third time point when the UE learns of the transmission conflict; and the first time point with the preset time interval relative to the second time point of occurrence of the transmission conflict is later than or equal to a fourth time point when the base station learns of the transmission conflict.

3. The method according to claim 2, wherein
the third time point when the UE learns of the transmission conflict is earlier than or equal to the second time point of occurrence of the transmission conflict; and the fourth time point when the base station learns of the transmission conflict is earlier than or equal to the second time point of occurrence of the transmission conflict.

4. The method according to claim 3, wherein the transmission conflict occurring between the feedback information for the first service data and the second service data comprises at least one of:

a transmission conflict occurring between the feedback information for the first service data and feedback information for the second service data; or a transmission conflict occurring between the feedback information for the first service data and the second service data transmitted via a dynamic scheduled physical uplink shared channel (PUSCH) resource.

5. The method according to claim 4, wherein the preset time interval is greater than or equal to 0.

6. The method according to claim 2, wherein
the third time point when the UE learns of the transmission conflict is later than or equal to the second time point of occurrence of the transmission conflict; and the fourth time point when the base station learns of the transmission conflict is later than or equal to the second time point of occurrence of the transmission conflict.

7. The method according to claim 6, wherein the transmission conflict occurring between the feedback information for the first service data and the second service data comprises at least one of:

a transmission conflict occurring between the feedback information for the first service data and the second service data transmitted via a semi-persistent configured PUSCH resource; or a transmission conflict occurring between the feedback information for the service data and the second service data transmitted via a semi-persistent configured scheduling request (SR) resource.

8. The method according to claim 7, wherein
the preset time interval is greater than or equal to a first time interval of which the base station demodulates the PUSCH resource; or the preset time interval is greater than or equal to a second time interval of which the base station demodulates the SR resource; or wherein the preset time interval is greater than or equal to the first time interval and the preset time interval is greater than or equal to the second time interval.

9. A method for transmitting feedback information, implemented using a base station, and comprising:

sending downlink control information (DCI), wherein the DCI comprises downlink scheduling information, the downlink scheduling information is configured for a user equipment (UE) to obtain a physical uplink control channel (PUCCH) resource for retransmitting feedback information for first service data, at a first time point with a preset time interval relative to a second time point of occurrence of a transmission conflict, and the transmission conflict is a transmission conflict occurring between the feedback information for the first service data and second service data.

10. A base station, comprising:

a processor; and a memory, configured to store instructions that, when executed by the processor, cause the method for transmitting feedback information according to claim 9 to be implemented.

11. The method according to claim 9, wherein the first time point with the preset time interval relative to the second time point of occurrence of the transmission conflict is later than or equal to a third time point when the UE learns of the transmission conflict; and the first time point with the preset time interval relative to the second time point of occurrence of the transmission conflict is later than or equal to a fourth time point when the base station learns of the transmission conflict.

12. The method according to claim 11, wherein the third time point when the UE learns of the transmission conflict is earlier than or equal to the second time point of occurrence of the transmission conflict; and the fourth time point when the base station learns of the transmission conflict is earlier than or equal to the second time point of occurrence of the transmission conflict.

13. The method according to claim 12, wherein the transmission conflict occurring between the feedback information for the first service data and the second service data comprises at least one of:

a transmission conflict occurring between the feedback information for the first service data and feedback information for the second service data; or a transmission conflict occurring between the feedback information for the first service data and the second service data transmitted via a dynamic scheduled physical uplink shared channel (PUSCH) resource.

14. The method according to claim 13, wherein the preset time interval is greater than or equal to 0.

15. The method according to claim 12, wherein the third time point when the UE learns of the transmission conflict is later than or equal to the second time point of occurrence of the transmission conflict; and the fourth time point when the base station learns of the transmission conflict is later than or equal to the second time point of occurrence of the transmission conflict.

16. The method according to claim 15, wherein the transmission conflict occurring between the feedback information for the first service data and the second service data comprises at least one of:

a transmission conflict occurring between the feedback information for the first service data and the second service data transmitted via a semi-persistent configured PUSCH resource; or a transmission conflict occurring between the feedback information for the first service data and the second service data transmitted via a semi-persistent configured scheduling request (SR) resource.

17. The method according to claim 16, wherein the preset time interval is greater than or equal to a first time interval of which the base station demodulates the PUSCH resource; or the preset time interval is greater than or equal to a second time interval of which the base station demodulates the SR resource; or wherein the preset time interval is greater than or equal to the first time interval and the preset time interval is greater than or equal to the second time interval.

18. A user equipment, comprising:

a processor; and a memory, configured to store instructions that, when executed by the processor, control the user equipment to:

at a first time point with a preset time interval relative to a second time point of occurrence of a transmission conflict, obtain a physical uplink control channel (PUCCH) resource for retransmitting feedback information for first service data, wherein the PUCCH resource is obtained from downlink scheduling information comprised in downlink control information (DCI) sent by a base station, and the transmission conflict is a transmission conflict occurring between the feedback information for the first service data and second service data;

retransmit the feedback information for the first service data using the PUCCH resource.

19. The method according to claim 18, wherein the first time point with the preset time interval relative to the second time point of occurrence of the transmission conflict is later than or equal to a third time point when the UE learns of the transmission conflict; and the first time point with the preset time interval relative to the second time point of occurrence of the transmission conflict is later than or equal to a fourth time point when the base station learns of the transmission conflict.

20. The method according to claim 19, wherein the third time point when the UE learns of the transmission conflict is earlier than or equal to the second time point of occurrence of the transmission conflict; and the fourth time point when the base station learns of the transmission conflict is earlier than or equal to the second time point of occurrence of the transmission conflict.

* * * * *